US008934615B2

(12) United States Patent
Yasrebi et al.

(10) Patent No.: US 8,934,615 B2
(45) Date of Patent: *Jan. 13, 2015

(54) MESSAGE ROUTING AND DETERMINING A MESSAGE RECIPIENT IN A UNIFIED MESSAGING SYSTEM (75) Inventors: Mehrad Yasrebi, Austin, TX (US); James Jackson, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 295 days.

This patent is subject to a terminal disclaimer.

(21) Appl. No.: 13/483,648

(22) Filed: May 30, 2012

(65) Prior Publication Data
US 2012/0237008 A1    Sep. 20, 2012

Related U.S. Application Data

(63) Continuation of application No. 12/582,263, filed on Oct. 20, 2009, now Pat. No. 8,209,386.

(51) Int. Cl.
*H04M 3/42*    (2006.01)
*H04M 1/62*    (2006.01)
(Continued)

(52) U.S. Cl.
CPC ............ *H04L 12/589* (2013.01); *G06Q 10/107* (2013.01); *H04L 12/587* (2013.01);
(Continued)

(58) Field of Classification Search
CPC .. G06Q 10/107; H04L 12/587; H04L 12/289; H04L 51/24; H04L 51/36; H04M 2203/4509; H04M 3/42059; H04M 3/53333; H04M 3/537

USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1, 88.11, 88.12, 379/88.22, 100.08, 201.01, 207.02, 207.08
See application file for complete search history.

(56) References Cited

U.S. PATENT DOCUMENTS 5,287,498 A * 2/1994 Perelman et al. ...................... 1/1
5,440,623 A * 8/1995 Moore et al. ............... 379/88.26
(Continued)

OTHER PUBLICATIONS

U.S. Appl. No. 12/568,714, filed Sep. 29, 2009, entitled "System and Method for Handling Call Redirections in a Voice Messaging System".

(Continued)

*Primary Examiner* — Khai N Nguyen
(74) *Attorney, Agent, or Firm* — Wolff & Samson, PC (57) ABSTRACT

A sender is identified based at least in part on originator identification information associated with an incoming communication. A message recipient is then determined based at least in part on the identified sender and one or more databases associated with message recipients by comparing the originator identification information to one or more entries in the one or more databases. The incoming communication is routed to the determined message recipient of a shared mailbox of a unified messaging system. An intended recipient is identified among the owners of the shared unified messaging mailbox owners. Only the determined message recipient is notified of the deposited message, based on the dynamic information derived from each deposited message.

6 Claims, 5 Drawing Sheets

(51) Int. Cl.
  *H04M 11/00* (2006.01)
  *G06F 15/16* (2006.01)
  *H04L 12/58* (2006.01)
  *G06Q 10/10* (2012.01)
  *H04M 3/533* (2006.01)
  *H04M 3/537* (2006.01)

(52) U.S. Cl.
  CPC ............... *H04L 51/24* (2013.01); *H04L 51/36* (2013.01); *H04M 3/42059* (2013.01); *H04M 3/53333* (2013.01); *H04M 3/537* (2013.01); *H04M 2203/4509* (2013.01)
  USPC ............... 379/201.01; 379/88.12; 379/88.13; 379/211.02; 709/206

(56) References Cited

U.S. PATENT DOCUMENTS

| | | | |
|---|---|---|---|
| 5,841,854 A * | 11/1998 | Schumacher et al. | 379/265.11 |
| 5,850,519 A * | 12/1998 | Vazana | 709/206 |
| 5,966,351 A | 10/1999 | Carleton et al. | |
| 6,553,102 B1 * | 4/2003 | Fogg et al. | 379/88.25 |
| 6,606,648 B1 | 8/2003 | Mukundan et al. | |
| 6,633,630 B1 | 10/2003 | Owens et al. | |
| 7,212,617 B2 | 5/2007 | Owens et al. | |
| 7,797,388 B2 | 9/2010 | Piccinini et al. | |
| 7,899,873 B2 * | 3/2011 | Jackson et al. | 709/206 |
| 8,099,390 B2 * | 1/2012 | Yasrebi et al. | 707/639 |
| 8,200,716 B2 * | 6/2012 | Yasrebi et al. | 707/804 |
| 8,209,386 B2 * | 6/2012 | Yasrebi et al. | 709/206 |
| 8,311,205 B2 * | 11/2012 | Jackson et al. | 379/211.03 |
| 8,396,203 B2 * | 3/2013 | Yasrebi et al. | 379/265.01 |
| 8,428,229 B2 * | 4/2013 | Yasrebi et al. | 379/88.22 |
| 8,478,795 B2 * | 7/2013 | Yasrebi et al. | 707/804 |
| 2002/0049768 A1 * | 4/2002 | Peek et al. | 707/104.1 |
| 2002/0087646 A1 | 7/2002 | Hickey et al. | |
| 2005/0080863 A1 | 4/2005 | Daniell | |
| 2005/0160145 A1 | 7/2005 | Gruen et al. | |
| 2006/0010210 A1 | 1/2006 | Keller | |
| 2007/0036301 A1 * | 2/2007 | Voticky et al. | 379/88.22 |
| 2007/0083656 A1 | 4/2007 | Bobo | |
| 2007/0127635 A1 * | 6/2007 | Zellner et al. | 379/67.1 |
| 2007/0177717 A1 | 8/2007 | Owens et al. | |
| 2008/0120386 A1 | 5/2008 | Piccinini et al. | |
| 2008/0177850 A1 | 7/2008 | Piccinini et al. | |
| 2008/0189372 A1 | 8/2008 | Solberg et al. | |
| 2008/0215694 A1 | 9/2008 | Chen et al. | |
| 2009/0129567 A1 | 5/2009 | Jackson et al. | |
| 2009/0156171 A1 | 6/2009 | Yasrebi et al. | |
| 2009/0161858 A1 * | 6/2009 | Goss et al. | 379/265.09 |
| 2009/0175430 A1 * | 7/2009 | Freeman et al. | 379/207.16 |
| 2009/0180597 A1 | 7/2009 | Jackson et al. | |
| 2009/0190742 A1 * | 7/2009 | Freeman et al. | 379/265.09 |
| 2009/0292777 A1 * | 11/2009 | Jackson et al. | 709/206 |
| 2010/0034368 A1 | 2/2010 | Finlayson et al. | |
| 2010/0153340 A1 * | 6/2010 | Yasrebi et al. | 707/639 |
| 2010/0153455 A1 * | 6/2010 | Yasrebi et al. | 707/791 |
| 2010/0153461 A1 * | 6/2010 | Yasrebi et al. | 707/802 |
| 2010/0189230 A1 * | 7/2010 | Jackson et al. | 379/88.22 |
| 2010/0329435 A1 * | 12/2010 | Yasrebi et al. | 379/88.22 |
| 2011/0093544 A1 * | 4/2011 | Yasrebi et al. | 709/206 |

OTHER PUBLICATIONS

U.S. Appl. No. 12/335,052, filed Dec. 15, 2008, entitled "Method and System for Managing Multiple Instance Subscriber Records in Unified Messaging Systems".

U.S. Appl. No. 12/335,021, filed Dec. 15, 2008, entitled "Method and System for Managing Changes in Organizational Data in Unified Messaging Systems".

U.S. Appl. No. 12/334,968, filed Dec. 15, 2008, entitled "Method and System for Automatically Defining Organizational Data in Unified Messaging Systems".

U.S. Appl. No. 12/123,996, filed May 20, 2008 entitled "System and Method of Controlling a Messaging System".

\* cited by examiner

MESSAGE ROUTING AND DETERMINING A MESSAGE RECIPIENT IN A UNIFIED MESSAGING SYSTEM

This application is a continuation of U.S. patent application Ser. No. 12/582,263, filed Oct. 20, 2009, now U.S. Pat. No. 8,209,386, which is entirely incorporated herein by reference.

BACKGROUND

The present disclosure relates generally to message routing and more particularly to message routing in a unified messaging platform environment.

Unified messaging is the integration of different forms of communication (e.g., email, voicemail, short message service (SMS), fax, etc.) into a single, unified message store (e.g., a unified messaging platform) accessible from a variety of user devices.

Call centers are an exemplary application of unified messaging. Call centers are offices used for the purpose of receiving and transmitting large volumes of requests by telephone or other communication devices. Call centers are used to receive incoming calls to an organization (e.g., a company, corporation, business unit, etc.). For example, call centers may be used as a customer service center staffed by multiple customer service representatives. Each representative may be responsible for one or more customer accounts and/or types of customer issues (e.g., account termination, maintenance, billing disputes, etc.).

However, a call center may be contacted with a single telephone number or a limited number of telephone numbers. That is, an organization may have a single customer service number (e.g., 1-800-CUSTOMR) that all customers call, regardless of the reason for calling. Incoming calls are then routed based on operator routing, automated interactive voice response (IVR) systems, or the like. If a particular customer service representative responsible for the incoming call is unavailable, the customer may be invited to leave a message in the form of a voicemail. In general, these voicemails are deposited to a shared mailbox for all customer service representatives. Similarly, a call center may be contacted using other forms of communications using one or a limited number of contact addresses (for example, using a single common email address such as customer_service@hypothetical_sample_company.com).

In a unified messaging platform environment, other communications methods, such as email and facsimiles, may also be used to contact customer service representatives. In call centers emails and facsimiles may be deposited along with the voicemails as described above. The term "call center" is used generically herein to refer to any organization which can be contacted, and it is assumed that such "call centers" can utilize any form of communication that may be supported by unified communication systems (also referred to as unified communications platforms).

Instead of inviting the customer to leave a message in the shared mailbox, the customer may be routed to a different customer service representative when a specific customer service representative is unavailable. However, as a consequence of the use of a shared mailbox by customer service representatives, customers may be poorly attended to and the time-to-response may be increased. Additionally, organizational resources are wasted sorting, correlating, and handling the deposited voicemails, emails, and facsimiles.

BRIEF SUMMARY

The present disclosure relates generally to message handling and more particularly to message handling in a unified messaging platform environment.

In one embodiment, an incoming communication includes sender identification information. A sender may be identified based on the sender identification information. A message recipient may then be determined based at least in part on the sender identification information and one or more databases associated with message recipients. The message recipient may be identified by comparing the sender identification information to one or more entries in the one or more databases that may be accessible by the recipient. The sender may then be associated with one message recipient. The incoming communication is then routed to the determined message recipient or recipients. A database that maps senders to one or more recipients may be part of and/or associated with one or more address books in the recipient organization in some embodiments.

An incoming message may be deposited in a unified messaging platform mailbox that is accessible by one or more recipients. These and other advantages of the present disclosure will be apparent to those of ordinary skill in the art by reference to the following detailed description and the accompanying drawings.

DETAILED DESCRIPTION

Figure 1:
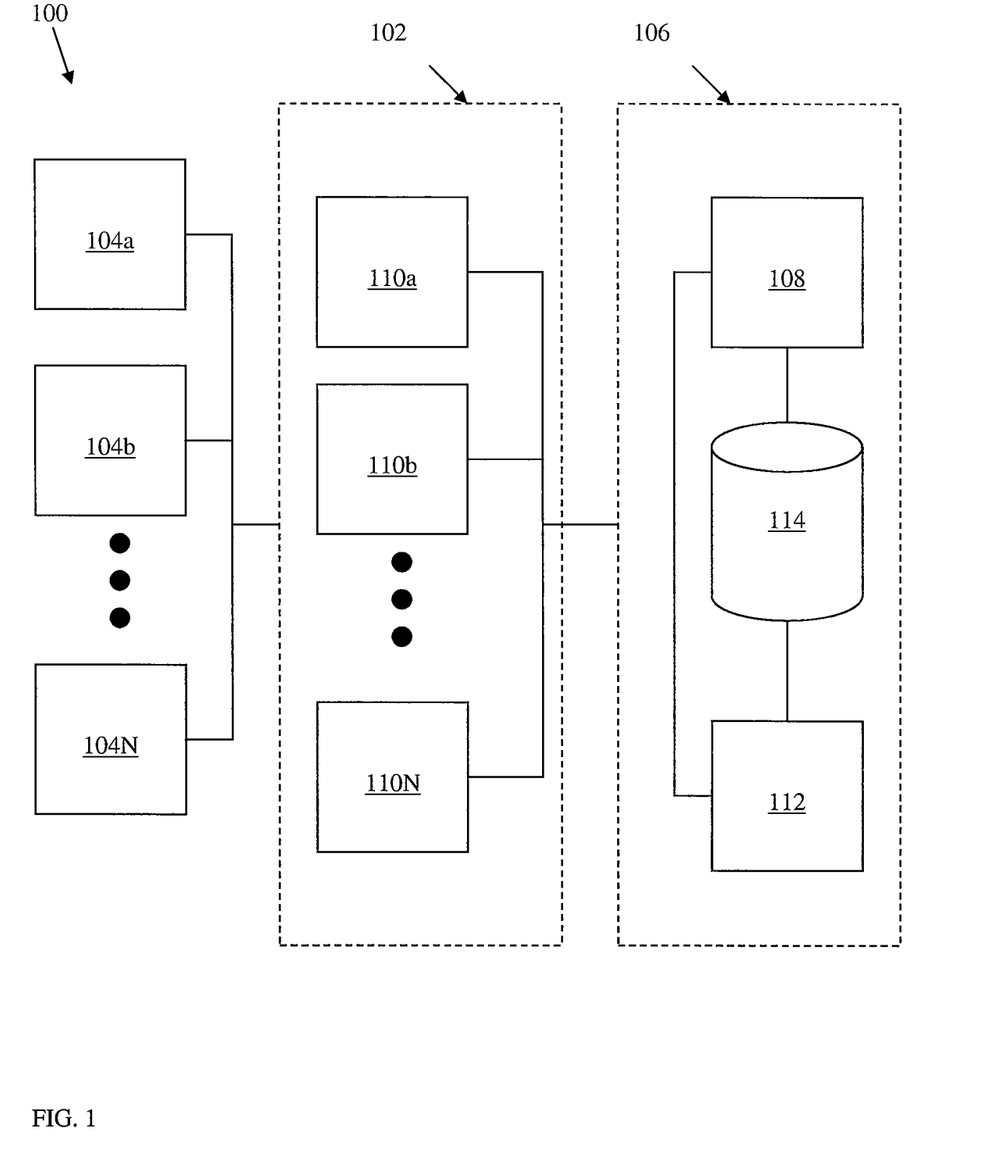
FIG. 1 depicts a calling system according to an embodiment of the present disclosure.

FIG. 1 depicts a calling system 100 according to an embodiment of the present disclosure. Calling system 100, which may be used in unified messaging (UM), includes an exemplary call center 102 in communication with one or more customers 104a, 104b, . . . , 104N and a UM platform 106.

Call center 102 includes one or more customer service representatives 110a, 110b, . . . , 110N. In at least one embodiment, customers 104a-N are connected to, and/or are in communication with call center 102 and one or more customer service representatives 110a-N using communication network 108 and/or communication network 120. The designation N is used only to indicate multiplicity of numbers, and the number of customers 104a-N may be different than the number of customer service representatives 110a-N.

Customer service representatives (CSRs) 110a-N are in communication with UM platform 106, which includes UM interface 108, UM controller 112, and/or UM database 114. Communication between UM interface 108 and customer service representatives 110a-N may be controlled by a UM controller 112. UM controller 112 and/or UM interface 108 may also control and/or be in communication with UM database 114. As described herein, "in communication with"

describes connection between components (e.g., customers 104a-N, UM interface 108, customer service representatives 110a-N, UM controller 112, UM database 114, etc.) that can transmit signals and/or information to each other using any appropriate protocol and combination of wired and/or wireless communication techniques (e.g., VOIP, wired, IP, etc.). In at least one embodiment, such communication may be through and/or with a telephone and/or packet network, as is known. For example, in some embodiments, CSRs 110a-N may communicate with (e.g., access) the UM platform 106 and their messages using telephone user interface (TUI) and/or one or more computer programs. Originators of voice or video calls that are not answered by any customer service representative 110a-N may choose to leave messages into the UM database 114 of the UM platform 106, as mediated by the UM interface 108 and UM controller 112. Other message types (for example, e-mail and facsimile messages) that may be addressed to the common customer service representatives 110a-N may also be deposited into the UM database 114 as managed by the UM controller 112.

Call center 102 and/or UM platform 106 may be constructed using any appropriate combination of physical components and special-purpose computers configured to carry out the specific functions described below. Additionally, various components of UM platform 106 may be combined and/or may have functionality split over various components. For example, UM interface 108 may include a database configured as UM database 114 and a controller configured as UM controller 112. In another example, UM controller 112 may be implemented in a program executed at a remote server that controls and routes calls and messages to UM interface 108 and/or customer service representatives 110a-N.

Customers 104a-N are users of the call center 102 using any appropriate communications device (e.g., telecommunications device, telephone, mobile telephone, email-capable device, facsimile machine, etc.) to communicate with call center 102 and/or customer service representatives 110a-N. UM platform 106 is based on a unified messaging system. As such, UM platform 106 supports voice, email, and facsimile message types in a unified fashion. For example, subscribers to (e.g., users of) UM platform 106, such as call center 102, may receive and deposit messages of any type in an associated mailbox or associate mailboxes of the UM platform 106. In this way, UM platform 106 is accessed via one or more networks (e.g., telephone, packet, etc.) to receive and handle messages based on incoming data. The UM platform may also initiate transmission of messages such as reminder messages.

UM interface 108 is any appropriate server or server-like device or devices that can receive information from customers 104a-N and can send information to and receive information from customer service representatives 110a-N and customers 104a-N. That is, UM interface 108 coordinates (e.g., receives and/or stores) communications from customers 104a-N who wish to access the call center 102 and customer service representatives 110a-N. In at least one embodiment, UM interface 108 includes a telephone user interface (TUI) program. In another embodiment, UM interface 108 may also include the communication capability to offer its users support for multimedia communication sessions to store video messages. UM interface 108 may be implemented as a computer, such as the computer 200 discussed below with respect to FIG. 2. That is, UM interface 108 may include and/or be a computer adapted to perform the methods described below with respect to FIGS. 4 and 5. As described above, UM interface 108 may be coupled to or include UM controller 112 and/or UM database 114.

Customer service representatives 110a-N are local and/or remotely connected representatives of an organization (e.g., customer care representatives, call center support staff, etc.) using any appropriate communications device (e.g., telecommunications device, computer with communication software/firmware, telephone, mobile telephone, email-capable device, facsimile machine, etc.) to communicate with call center 102 and/or customers 104a-N.

UM controller 112 is any appropriate module that can send information to and receive information from UM interface 108, customers 104a-N, and customer service representatives 110a-N. That is, UM controller 112 coordinates communications between UM interface 108 and customer service representatives 110a-N in accordance with the methods described herein. In at least one embodiment, UM interface 108 may implement an application programming interface (API). In another embodiment, UM controller 112 may handle processing of messages such as recorded voice and/or vide calls, e-mails and facsimiles. In an alternative embodiment, UM controller 112 is a remote web server or similar device capable of performing the functions described below. In either embodiment, UM controller 112 may be implemented as a computer, such as the computer 200 discussed below with respect to FIG. 2. That is, UM controller 112 may include and/or be a computer adapted to perform the methods described below with respect to FIGS. 4 and 5.

Figure 3:
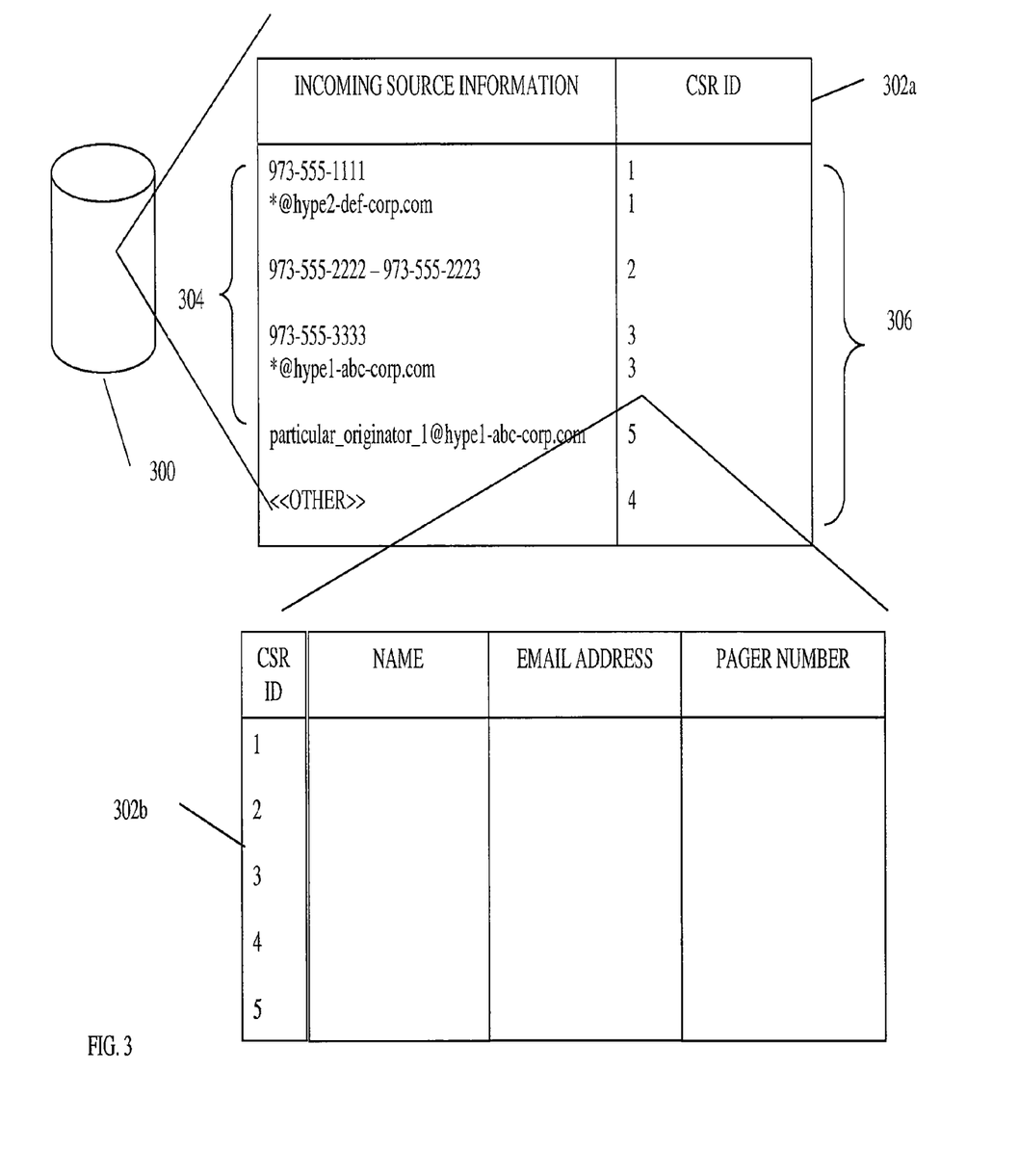
FIG. 3 depicts a database according to an embodiment of the present disclosure.

UM database 114 is any appropriate database, such as the database described below with respect to FIG. 3. In at least one embodiment, UM database 114 is a database that can contain data to correlate information (e.g., invoice number, telephone number, trouble ticket, etc.) related to customers 104a-N with an associated customer service representative 110a-N. The database 300 described below with respect to FIG. 3 is an example of the correlations and/or associations that may be used to implement the methods described below with respect to FIGS. 4 and 5. Portions of database 114 may be associated with or related to or used with one or more address books (not shown) of call center 102.

Communications to and/from UM platform 106 and customer service representatives 110a-N and customers 104a-N may be through the analog communication network 118 (e.g., one or more telephone networks) and/or packet communication network 120 (e.g., a private local area network, a private wide area network and/or the public network known as the Internet). The interface components of UM platform 106 to the analog communication network 118 and packet communication network 120 are not shown, but may be implemented as part of UM interface 108 in at least one embodiment. In at least one embodiment, email messages and multimedia (e.g., voice and/or data) can be transmitted through the packet communication network 120, and facsimile messages can be transmitted through the analog communication network 118 and/or packet communication network 120. Various communications components and network connections are not shown in FIG. 1, and are apparent to persons skilled in the art. Communication network 118 and communication network 120 may be implemented using any past, present and future protocols and such technologies would not be excluded from the scope of this present disclosure. For example, communication network 120 may be implemented using one or more protocols such as GSM, wimax, 802.11a, 802.11g, 802.11n, 802.3 Ethernet, leased lines, and other technologies. Communication network 118 and communication network 120 may each consist of one or more networks. For example, communication network 120 may include a GSM network for wireless communications to and from one or more customers 104a-N, one or more wired connections to one or more customers 104a-N, and have one or more wired connections to call center 102 and the customer service representatives 110a-N. Detailed components, such as possible additional networks and equipments associated with call center 102 and customers 104a-N are not shown.

Figure 2:
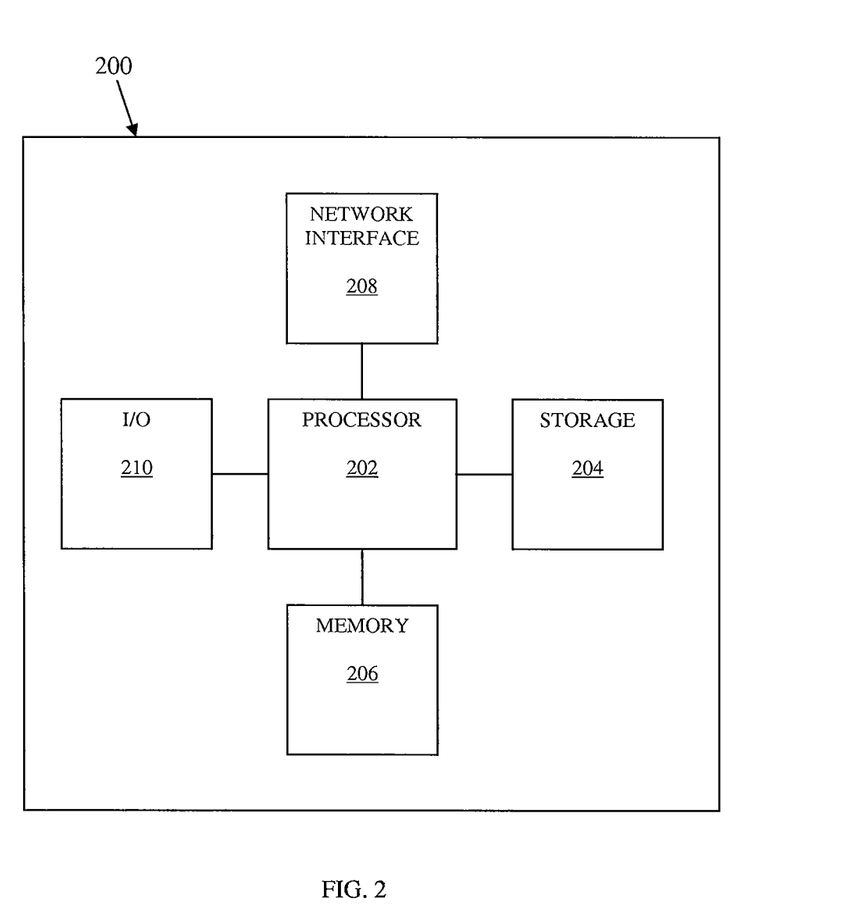
FIG. 2 is a schematic drawing of a computer used to practice the present disclosure.

FIG. 2 is a schematic drawing of a computer 200 according to an embodiment of the present disclosure.

Computer 200 contains devices that form a controller including a processor 202 that controls the overall operation of the computer 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as those described below with respect to method 400 are defined by the computer program instructions stored in the memory 206 and/or storage 204 and controlled by the processor 202 executing the computer program instructions. The computer 200 may also include one or more network interfaces 208 for communicating with other devices via a network. The computer 200 also includes input/output devices 210 that enable operator interaction with the computer 200. Computer 200 and/or processor 202 may include one or more central processing units, read only memory (ROM) devices and/or random access memory (RAM) devices. One skilled in the art will recognize that an implementation of an actual computer could contain other components as well, and that the computer of FIG. 2 is a high level representation of some of the components of such a computer for illustrative purposes.

According to some embodiments of the present disclosure, instructions of a program (e.g., controller software) may be read into memory 206, such as from a ROM device to a RAM device or from a LAN adapter to a RAM device. Execution of sequences of the instructions in the program may cause the computer 200 to perform one or more of the method steps described herein. In alternative embodiments, hard-wired circuitry or integrated circuits may be used in place of, or in combination with, software instructions for implementation of the processes of the present disclosure. Thus, embodiments of the present disclosure are not limited to any specific combination of hardware, firmware, and/or software. The memory 206 may store the software for the computer 200, which may be adapted to execute the software program and thereby operate in accordance with the present disclosure and particularly in accordance with the methods described in detail below. However, it would be understood by one of ordinary skill in the art that the present disclosure as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

FIG. 3 depicts a database 300 according to an embodiment of the present disclosure. In at least one embodiment, database 300 is used as UM database 114 of FIG. 1. In an exemplary embodiment, database 300 includes one or more tables 302a and 302b. Tables 302a-b may include a list of incoming source information 304 (e.g., telephone numbers (TN), TN ranges, email addresses, email domains, etc. associated with customers 104a-N) and/or an associated customer care representative (CCR) identification (ID) 306. Database 114 may include other information (not shown) such as some data that may be used in the general operations of unified messaging platforms. Database 300 may be a flexible mapping database and may be configured (e.g., by a user of the call center 102).

Database 300 may be collection of data that is stored in a computer (e.g., computer 200 of FIG. 2) wherein a database management system (DBMS) may consult the database 300 to answer queries (e.g., to select data). Data retrieved in answer to queries become information that can be used to make decisions, precipitate actions, or displayed to a customer service representative 110a-N.

For simplicity, database 300 is depicted and described in the embodiment of FIG. 3 as a relational database. In the same or alternative embodiments, all or part of database 300 may configured according to another database model such as a hierarchical model, a table model, a network model, an object model, an associative model, etc.

Tables 302a-b may be data tables as is known in the use of databases. It is understood that though represented in FIG. 3 as two tables 302a and 302b, any number of tables may be used to store and correlate data. Similarly, though depicted as tables, tables 302a-b are a visual representation of a database relation and any appropriate implementation of data storage and correlation may be used. As such, tables 302a-b may also represent data that may be related to or used in conjunction with one or more address books or portions thereof for use by customer service representatives 110a-N. Other data that is not shown may be stored in conjunction with the data shown in FIG. 3. The exemplary data that is shown in FIG. 3 is used to identify a first customer service representative 110i (among the customer service representatives 110a-N), where the customer service representative 110i is responsible for handling the incoming message.

Tables 302a-b may be a set of data elements organized using rows and columns which may be accessed via the DBMS (e.g., as in a look-up table). The columns may be identified by title (e.g., "Incoming Source Information" and "customer service representative (CSR) ID") or another identifier. The rows may be identified by the values (e.g., "973-555-1111", "1", etc.) appearing in particular columns. In some embodiments rows may also have titles or other identifiers.

The list of incoming source information 304 may include data values associated with incoming communications to call center 102, such as those made by customers 104a-N. That is, incoming source information 304 may be a list of telephone numbers, facsimile numbers, email addresses, and/or the like of users who have previously contacted call center 102 and/or have some other prior association with call center 102. Accordingly, when call center 102 receives a communication from a particular known source, UM database 300 may be accessed to determine any appropriate associations (e.g., associations with a particular CSR ID 306, associations with a particular customer service representative 110a-N, address book information, etc.). Such associations are stored and maintained in database 300 such that incoming communications can be associated with specific target customer service representatives 110a-N.

CSR IDs 306 may be a list of customer service representatives 110a-N associated with particular incoming source information 304. In at least one embodiment, each such list contains at most one CSR ID 306. In at least another embodiment, each such list may contain more than one customer service representative 110a-N, where each such customer service representative 110a-N may be identified with a different and unique CSR ID 306. In the particular embodiment shown in FIG. 3, the CSR IDs 306 may be stored (e.g., listed) along with the incoming source information 304 in tabular form. It may be understood that any other arrangement (e.g., arrays, connection pathways, etc.) may be used to associate the CSR IDs 306 with the incoming source information 304. As seen in FIG. 3, the particular customer service representatives 110a-N (1, 2, 3, 4, 5) designated in CSR IDs 306 are associated with corollary incoming source information 304. For example, incoming telephone number 973-555-1111 is associated with CSR ID 1 (e.g., with customer service representative 1), incoming telephone number 973-555-2222 and facsimile number 973-555-2223 are associated with CSR ID 2 (e.g., with customer service representative 2), incoming telephone number 973-555-3333 and any message (e.g., e-mail message) from the domain hype1-abc-corp.com are associated with CSR ID 3 (e.g., with customer service representative 3), and "other" situations where no rule is found (e.g., when the calling telephone number is not available or configuration information for a source information can not be found) are associated with CSR ID 4 (e.g., with customer service representative 4). Of course, other rules, algorithms, tables, or data structures may be used as appropriate.

For example, a sender with e-mail address particular_originator_1@hype1-abc-corp.com is associated with a CSR 5 (e.g., with customer service representative 5), whereas all other communications originating from the hype1-abc-corp.com domain are routed to a customer service representative with CSR ID of 3. More than one originator may be mapped to one particular customer service representative. For example, all communications with source information hype2-def-corp.com and 973-555-1111 may also be sent to a customer service representative with CSR ID of 1, and all messages from sources with telephone numbers 973-555-2222 and 973-555-2223 are associated with the customer with CSR ID of 2 (e.g., customer service representative 2). Persons skilled in the art recognize that various syntax forms may be used to specify such mapping rules (e.g., where ranges of telephone numbers may be specified on each row, where string pattern matching rules are used, etc.). Such syntax variations are not excluded, and are not shown. Any number of source information and customer service representative associations may be specified as allowed by the particular technology, and no restrictions on such number of associations are assumed.

Tables 302a-b may be related in a hierarchical structure in that table 302b may provide further information about table 302a. In the exemplary embodiment of FIG. 3, table 302b may include further customer service representative information related to the values included in CSR ID information column of table 302a. For example, if a customer 104a-N is associated with the incoming telephone number "973-555-1111" from the list of incoming source information 304, that customer is associated with a customer service representative "1", and the information about the particular customer service representative with CSR ID of "1" may be included in table 302b. This information may be stored in table 302b such that any incoming calls, communications and/or messages may be routed to customer service representative "1". Additional information about the customer service representative "1", such as name, email address, pager number, address, or the like, may be stored in table 302b.

Additional columns and tables (not shown) may be used to associate other information with particular customer service representatives and/or particular customers as needed. For example, an additional column may be used to associate specific messages (e.g., using rows for specific message IDs in another table of messages, which is not shown) with external data (e.g., ticket identification information for a particular customer, etc.). In this way, unique message identification information for one or more UM mailboxes, as discussed above with respect to FIG. 1, external data identification, and/or similar information is available to UM platform 106 and/or customer service representatives 110a-N.

As described herein, a database may be considered to include both software and supporting hardware. In this way, the database is used to store and retrieve data on storage media. Part of the software for a database is referred to as a database manager, which is a piece of software that handles storage and retrieval of data from the database.

Exemplary data arrangements that can be stored as tables 302a and 302b in a database are represented as tables for visual and demonstrative clarity. Of course, any other arrangement of the underlying data and/or metadata may be used. Data represented as tables 302a and 302b is shown to be stored in database 300. Database 300 is used by UM to implement the methods of the present disclosure.

UM systems use various other data and databases that are not shown here and are used to implement the UM functionality. The data shown in FIG. 3 may be stored in an existing UM database (e.g., into an Oracle "database" as separate tables) or stored in a new separate database (e.g., another Oracle or IBM database) and used by a UM system to implement the methods of the present disclosure.

In some embodiments, one or more address books may be consulted to find information corresponding with information contained in database 300. The address book may be consulted to determine where to route messages addressed from a particular source if such information is not contained in database 300 (e.g., in tables 302a-b). As discussed herein, the address book may be stored in database 300 or another location and is used to store information about customer service representatives 110a-N and/or customers 104a-N. For example, an incoming email message may be addressed from user1@mail1.com. Though no such entry exists in table 302a, the email address may be looked up in the address book and found to be associated with the incoming source information telephone number 973-555-1111. Thus, the incoming email message from user1@mail1.com is handled according to the same protocol as messages from 973-555-1111—it is associated with customer service representative "1".

In the same or alternative embodiments, messages may be routed to another customer service representative by way of a separate entry in table 302a. For example, if a correct entry exists in table 302a to associate a source information user1@mail1.com with the CSR ID 5 (e.g., customer service representative 5), this entry may be favored and used regardless of whether user1@mail1.com is associated with telephone number 973-555-1111 in an address book. Myriad configurations may be used to arrange database 300 to associate messages from particular sources with particular customer service representatives. A person of skill in the art would recognize that the use of an address book in conjunction with rules defined in a table such as table 302a allows for associating all or a portion of messages from an associated group of sources (e.g., a company and its various email addresses, facsimile numbers, and/or telephone numbers) to appropriate customer service representatives.

In some embodiments, the sender's source information is not configured as part of incoming source information 304, but may be determined and used as described below. For example, when the UM controller cannot find the incoming source information or any specific rules for an identified source information, the UM controller uses the default "other" rule.

Figure 4:
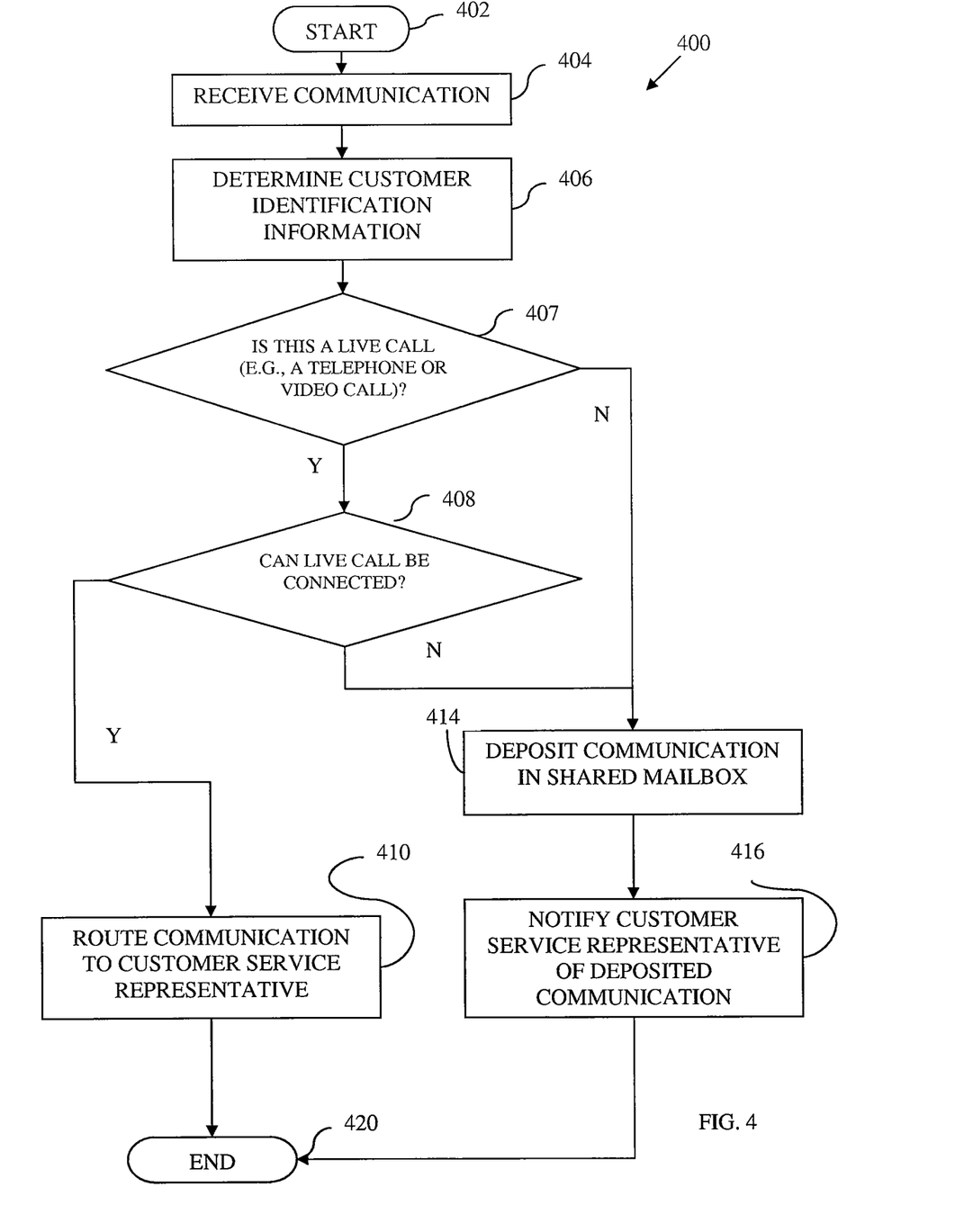
FIG. 4 is a flowchart of a method of message handling in a unified messaging system according to an embodiment of the present disclosure.

FIG. 4 is a flowchart of a method 400 of message handling in a unified messaging system according to an embodiment of the present disclosure. The method 400 may be performed by components of call center 102 and/or UM platform 106 as discussed below. Specifically, a network (e.g., a packet network, a telephone network, etc.), a portion of a network, UM controller 112, and/or UM interface 108 may be used to perform the steps of method 400 as appropriate. The method begins at step 402.

In step 404, a communication is received at call center 102. The communication may be a message, telephone call, email, facsimile, short message service (SMS) message, text message, or the like received from a customer 104a-N. In at least one embodiment, the communication is routed by a telephone or packet network as is known.

In step 406, user (e.g., customer) identification information is determined by the communication network(s) (not shown). Analog and/or packet network(s) (not shown) carry originator (customer) source information.

Step 407 is used to describe how different communication types can be routed through the analog communication network 118 and/or the packet communication network 120. A communications attempt that may be connected to the contacted end-point (e.g., a customer service representative 110a-N subscriber of the um platform 106) for immediate interactive communications such as a telephone call, a video call or facsimile call is called a live call herein. Communication network 118 and/or communication network 120 route other communication types that are not for such live interactions such as e-mails and text messages into the unified messaging platform 106 for processing and subsequent depositing into the shared mailbox of customer service representatives by UM controller 112 in step 414. If this communications attempt is for a live call, the method proceeds to step 408 and various components (not shown) of the analog communication network 118 or the packet communication network 120 attempt to connect the call by contacting the end point device (e.g., such as an analog telephone, an Internet Protocol (IP) telephone, a software program on a computer that can acts as a multimedia phone, a facsimile device, a facsimile sever) associated with the customer service representative 110a-N subscriber of the um platform 106.

In step 408, if such a live call attempt can be successfully connected to the customer service representative 110a-N by the analog communication network 118 or the packet communication network 120, the method proceeds to step 410, where the customer 104a-N can communicate with any available customer service representative 110a-N. In step 408, if a live call attempt cannot be connected to the customer service representative 110a-N by the analog communication network 118 or the packet communication network 120, various components (not shown) of that communication network re-route the call attempt towards the UM platform 106, the method proceeds to step 414, and the calling customer 104a-N or his device (e.g., a facsimile device) can deposit a message into the communal mailbox of customer service representatives 110a-N in the um platform 106 in step 414, where the mailbox is shared by all customer service representatives 110a-N.

In at least one embodiment, in step 414, the UM controller 112 uses the incoming source information, which may be a telephone number, email address, Internet Protocol (IP) address, or any other appropriate identifier, to deposit the message (e.g., voice message, video message, e-mail, facsimile, etc.) into a mailbox that is shared by the customer service representatives 110a-N. After the message is deposited into the shared mailbox, the method proceeds to step 416. UM controller 112 creates a unique message identification code (message ID) for the newly deposited message.

UM controller 112 may identify and notify the specific customer service representative in step 416 of the arrival of the particular message. As described above with respect to FIG. 3, tables 302a-b of UM database 300 may be accessed (e.g., by UM controller 112) and a particular customer service representative 110a-N may be identified. In this way, a specific intended message recipient user of the shared mailbox may be determined by the UM controller 112 by querying one or more databases such as UM database 114 and other databases (not shown), For example, if UM controller 112 cannot find the incoming source information 304 in database 300 at first, it may consult one or more other databases such as address book databases (not shown) for other information regarding that source, and use the additional information to search for source information 304 in database 300 again. As a particular example, if a voice message arrived from (512) 333-4444 and an address book database identified the (512) 333-4444 number to be associated with a person with email address particular_originator_1@hype1-abc-corp.com, then UM controller 112 may associate that message with customer service representative 110i, whose CSR ID 306 is 5. If the UM controller cannot find any source information or configuration data regarding a source information for a message, the UM controller can choose to treat the incoming message using a default "other" rule, as described earlier. In other words, UM controller 112 may query UM database 114 (which was further described in FIG. 3 as database 300) to determine which particular customer service representative 110i (among customer service representatives 110a-N) is to be associated with the incoming communication.

In some embodiments, one or more additional or auxiliary databases are used in conjunction with database 300 and/or UM database 114. For example, as described herein, one or more address books may be accessed by the customer service representatives 110a-N or controllers associated therewith. In some embodiments, one or more address books may be consulted to find information corresponding with information contained in database 300. The address book may be consulted to determine where to route messages addressed from a particular source if such information is not contained in database 300 (e.g., in tables 302a-b). As discussed herein, the address book may be stored in database 300 or another location and is used to store information about customer service representatives 110a-N and/or customers 104a-N.

After deposition of the communication, the particular customer service representative 110i is notified of the communication in step 416. Notification may be by any appropriate means, such as a page, telephone call, email, email alert, SMS message, voicemail, or the like. In at least one embodiment, this notification would include information indicative of the customer identified in step 406 and identification information for the particular message (e.g., a message ID). In this way, the particular customer service representative 110a-N responsible for a particular customer 104a-N and/or message is notified that a customer has left a message. Deposition of the communication and notification of the customer service representative is discussed in further detail below with respect to method 500 of FIG. 5. The method 400 ends at step 420.

The logic described above with respect to method 400 uses dynamic data (as available at the moment of execution of the steps when handling each new message). Dynamic data in database 300 and other databases (e.g., an address book database) can be changed at any moment and the change can affect the handling of all messages that arrive after that/those changes are made. For example, one can add a new entry to table 304 as cookie_monster@pbs.org to go to the CSR with ID 2. If no such entry existed in database 300 or another database such that no source rule could be identified for this sender (cookie_monster@pbs.org), previous messages from cookie_monster@pbs.org would have ended up at CSR with ID 4, but will end up at CSR with ID 2 after table 304a has been changed.

Figure 5:
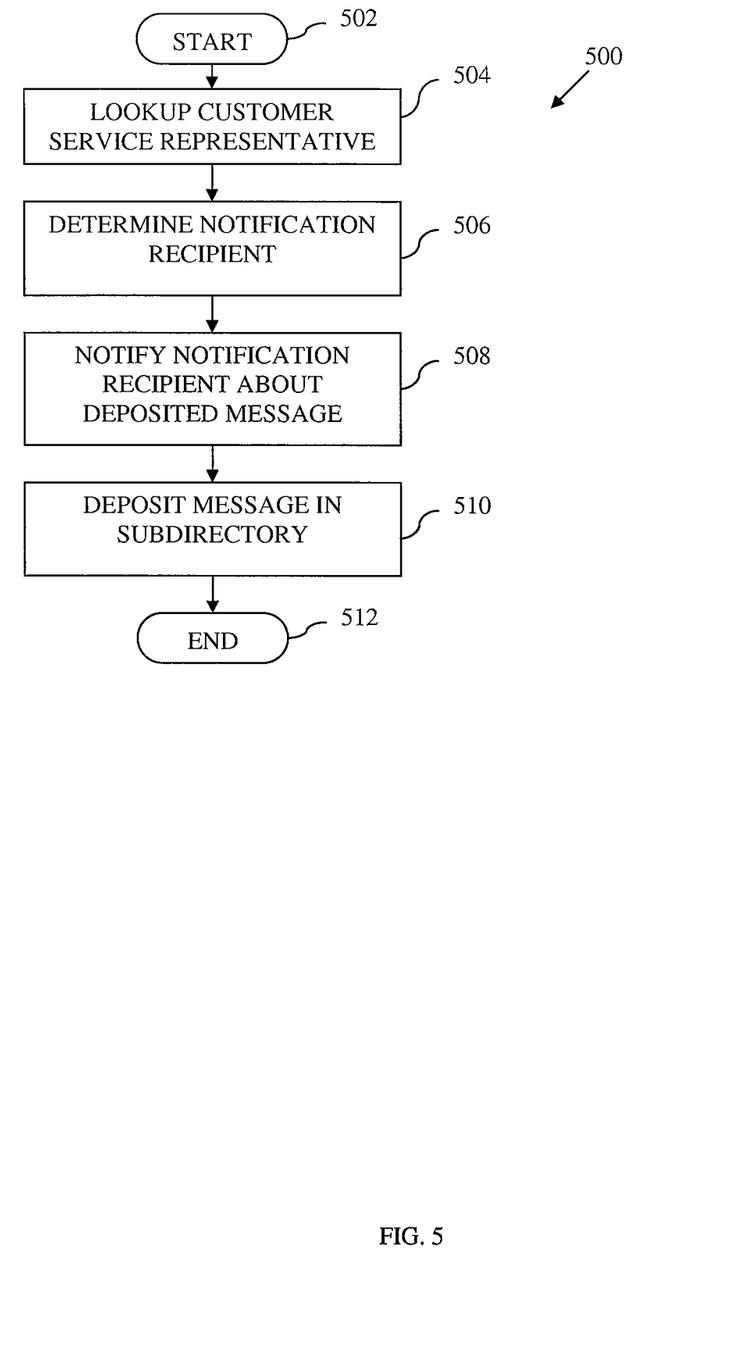
FIG. 5 is a flowchart of a method of message handling in a unified messaging system according to an embodiment of the present disclosure.

FIG. 5 is a flowchart of a method 500 of message handling in a unified messaging system according to an embodiment of the present disclosure. The method 500 may be performed by components of UM platform 106 as discussed herein. Specifically, UM controller 112 and/or UM interface 108 may be used to perform the steps of method 500 as appropriate. As mentioned above, method 500 further describes steps 414 and 416 of method 400. Accordingly, the method 500 is performed on a message deposited in a communal mailbox. The method begins at step 502.

In step 504, a lookup is performed to determine a particular customer service representative 110i (among customer service representatives 110a-N). In at least one embodiment, the lookup is performed by UM controller 112 on database 114 of FIG. 1 and/or database 300 of FIG. 3 as described above. In other words, a specific customer service representative 110i is determined based on some information associated with an incoming communication (e.g., message).

In step 506, a notification recipient is identified. The notification recipient is a particular customer service representative 110i (among customer service representatives 110a-N) who should receive notification of the particular deposited message. In at least one embodiment, the notification recipient is the customer service representative 110i determined in step 504. That is, a particular customer service representative 110i that is associated with a message that has been deposited in a communal mailbox is identified.

In step 508, the notification recipient is notified of the deposited message by the UM controller 112. Though the message has been deposited in a communal mailbox (e.g., a mailbox accessible by one or more customer service representatives 110a-N), the notification of the deposited message is sent only to the notification recipient 110i determined in step 506. In this way, a message is identified as being of some import to a particular customer service representative 110i, party, etc. and only this particular customer service representative 110i, party, etc. is notified. This differs from conventional notification services that send notification of a deposited message to all parties or only one statically-determined (independently of the originator information) party who have access to the communal mailbox.

In some embodiments, in step 510, the deposited message is deposited in a subdirectory of the communal mailbox. The subdirectory may be associated with a particular customer service representative 110i or group of customer service representatives 110a-N or other individual or group. Other categorizations and storage mechanisms may be used to identify and associate the deposited messages in accordance with the methods and structures described above.

The method ends at step 512.

Though discussed generally above as a generic communication or message in methods 400 and 500, one of skill in the art would recognize that the communication or message could be a facsimile, email, voicemail, picture message, or any other appropriate information received from a customer or other source.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. An apparatus for message handling in a unified messaging system comprising:
a processor; and
a memory to store computer program instructions, the computer program instructions when executed on the processor cause the processor to perform operations comprising:
maintaining a database comprising source information of a plurality of senders each associated with recipient identification of a plurality of recipients;
receiving a first communication from a first sender of the plurality of senders;
accessing the database to identify a first recipient based on particular source information of the first sender;
notifying the first recipient of receipt of the first communication by sending a notification message to the first recipient;
routing the first communication to the first recipient;
if the first recipient is unavailable, depositing the first communication in a shared mailbox of the plurality of recipients;
receiving a second communication from a second sender of the plurality of senders;
determining an email address of the second sender of the plurality of senders;
determining which one of the plurality of recipients to route the second communication to based on looking up the email address in an address book, wherein the address book comprises an association between the email address and a telephone number of the second sender of the plurality of senders; and
routing the second communication to a second recipient of the plurality of recipients, wherein the second recipient of the plurality of recipients is associated with the telephone number in the database.

2. The apparatus of claim 1, wherein the database further comprises:
a facsimile number associated with a third recipient of the plurality of recipients;
an email domain associated with a fourth recipient of the plurality of recipients;
the method further comprising:
determining that corresponding source information of the second sender of the plurality of senders is not maintained in the database;
creating a new entry in the database, the new entry comprising the corresponding source information of the second sender of the plurality of senders associated with a fifth recipient of the plurality of recipients; and
routing the second communication to the fifth recipient.

3. The apparatus of claim 1, wherein the database stores data to correlate information related to each of the plurality of senders with an associated recipient of the plurality of recipients associated with the shared mailbox, and wherein the information comprises a trouble ticket.

4. A non-transitory computer readable medium storing computer program instructions, which, when executed on a processor, cause the processor to perform operations comprising:
maintaining a database comprising source information of a plurality of senders each associated with recipient identification of a plurality of recipients
receiving a first communication from a first sender of the plurality of senders;
accessing the database to identify a first recipient based on particular source information of the first sender;
notifying the first recipient of receipt of the first communication by sending a notification message to the first recipient;
routing the first communication to the first recipient;
if the first recipient is unavailable, depositing the first communication in a shared mailbox of the plurality of recipients;
wherein the database comprises:
a telephone number associated with a second recipient of the plurality of recipients;
a facsimile number associated with a third recipient of the plurality of recipients;
an email domain associated with a fourth recipient of the plurality of recipients;
receiving a second communication from a second sender of the plurality of senders;
determining that corresponding source information of the second sender of the plurality of senders is not maintained in the database;
creating a new entry in the database, the new entry comprising the corresponding source information of the second sender of the plurality of senders associated with a fifth recipient of the plurality of recipients; and
routing the second communication to the fifth recipient.

5. A non-transitory computer readable medium storing computer program instructions, which, when executed on a processor, cause the processor to perform operations comprising:
maintaining a database comprising source information of a plurality of senders each associated with recipient identification of a plurality of recipients;
receiving a first communication from a first sender of the plurality of senders;
accessing the database to identify a first recipient based on particular source information of the first sender;
notifying the first recipient of receipt of the first communication by sending a notification message to the first recipient;
routing the first communication to the first recipient;
if the first recipient is unavailable, depositing the first communication in a shared mailbox of the plurality of recipients;
receiving a second communication from a second sender of the plurality of senders;
determining an email address of the second sender of the plurality of senders;
determining which one of the plurality of recipients to route the second communication to based on looking up the email address in an address book, wherein the address book comprises an association between the email address and a telephone number of the second sender of the plurality of senders; and
routing the second communication to a second recipient of the plurality of recipients, wherein the second recipient of the plurality of recipients is associated with the telephone number in the database.

6. The non-transitory computer readable medium of claim 5, wherein the database stores data to correlate information related to each of the plurality of senders with an associated recipient of the plurality of recipients associated with the shared mailbox, and wherein the information comprises a trouble ticket.

* * * * *